United States Patent [19]
Bach

[11] 3,880,734
[45] Apr. 29, 1975

[54] PROCESS FOR THE SEPARATION OF ERGOTAMINE

[76] Inventor: Jean Bach, Waldstrasse 19, D-8032 Grafelfing, Germany

[22] Filed: Mar. 20, 1974

[21] Appl. No.: 453,152

[52] U.S. Cl. ............................................. 204/155
[51] Int. Cl. ............................................. B01k 1/00
[58] Field of Search ................................... 204/155

[56] References Cited
UNITED STATES PATENTS
2,664,394   12/1953   Reeves .............................. 204/155

*Primary Examiner*—Howard S. Williams
*Attorney, Agent, or Firm*—Toren, McGeady and Stanger

[57] ABSTRACT

This invention relates to a process for the separation of ergotamine.

14 Claims, 3 Drawing Figures

PROCESS FOR THE SEPARATION OF ERGOTAMINE

Ergotamine is the main alkaloid of ergot (*Claviceps purpurea*), occurring in the plant in an amount of about 0.5%. This proportion fluctuates, however, considerably due to the conditions under which the plant grew. Ergot contains, in addition to ergotamine, a number of other alkaloids, all of which are, the same way as ergotamine is, natural derivates of the lysergic acid. The production of prescription drugs in the pharmaceutical industry requires a process whereby ergotamine can be separated from the heterogenous alkaloid mixture in the ergot plant with purity grade and yield, both held as high as possible. Since ergot alkaloids are highly unstable compounds, the treatment must be carried out with utmost care and under conditions so mild as to prevent the decomposition of these very delicate and valuable substances.

According to known methods ergotamine is separated from the alkaloid mixtures by extraction, utilizing the good solubility of certain ergotamine salts. The division of these mixtures into several liquid phases has equally been attempted. (Swiss Pat. No. 79,879, German Pat. No. 357,272, Helv. Chim. Acta 28, 1283 / 1954).

All of the hitherto known extraction methods have, however, several disadvantages of which the following are to be mentioned:

The yield of these known processes is rather limited, because the decreasing ergotamine-concentration always is followed by solvent-equilibria between the different liquid phases, indispensable in the extraction procedure. In consequence of these equilibria the efficiency of the operation decreases continually and proportionately.

Consequently, in the usual extraction methods a substantial amount of time and solvent are required to obtain an at least acceptable yield. When the solvents act upon them, the extremely unstable ergot-alkaloids are being subjected to severe chemical stress for relatively long periods of time. Conventional extraction procedures may take one week to conclude. This involves considerable risk of undesirable chemical changes occurring in said unstable alkaloids. Thus, with the conventional extraction methods a substantial quantity of valuable alkaloids is being wasted. This loss is mainly due to involuntary oxidation and decomposition. The highly toxic by-products of the usual extraction methods are, almost without exception, formed this way.

The solvent equilibria entail the application of a series of enrichment-steps, which is not only time-consuming but also requires many work-hours of highly trained and well-paid operators. This way the cost of these processes is further increased.

The purity grade of ergotamine, prepared by the conventional extraction processes is not high enough to permit its direct application in pharmaceutical products. The obtained ergotamine is usually contaminated with several compounds, mainly with the so-called ergotoxines and also with some other components of the original heterogeneous mixture mentioned above. Thus the product has to be subjected to an expensive crystallization process prior to its use in prescription drugs.

The present invention aims at the elaboration of a new process whereby the separation of ergotamine from the raw material can be improved without affecting the further processing of the other alkaloids contained in the ergot and by which a higher grade of purity is ensured in a shorter time and with less expense.

According to the invention, the above is achieved by subjecting a liquid containing the ergot-alkaloids to the simultaneous action of a static or a low-frequency electric and/or a magnetic field and, additionally, of a high-frequency electromagnetic field. Upon this treatment the relatively well soluble ergotamine present in the liquid is reversibly converted into its isomeric form, ergotaminine, the solubility of which is poor and which is thus being precipitated. The precipitate is removed from the liquid and the ergotaminine subsequently is reconverted into ergotamine by a known method.

There are two ways to induce dipoles into ergotamine, or into any other molecule having similar properties, on the basis of their pronounced electric anisotropy. The alkaloids of the lysergic acid type are all of this kind. Dipoles can be induced with a static, or a very low frequency electric field and/or with a homogeneous magnetic field. The electric field acts by deforming the electron shell, while the magnetic field acts by shielding or de-shielding a proton. In principle the two effects cannot be distinguished sharply, since when switching on the static field, an electric field is always produced as a consequence of the displacement current, whereas a magnetic field induces an electric field due to intramolecular effects.

Low-frequency electric and magnetic fields are similar in effect to static fields, provided that their frequency is sufficiently low.

When an electric field is being used, the deformation of the electron-shell will not only produce dipoles, but also polar bonds.

Since the alkaloid molecules are absorbed on the electrodes they are fully exposed to the field strength in a very thin layer; consequently, the isomerisation effect is greatly reinforced. The intensity of this effect of the field invites the application of very short exposure-periods thereby ensuring the mildest possible conditions for the fragile alkaloid molecules. The shorter time they remain exposed to the solvents and to the field, the more they will be able to endure treatment and separation without being destroyed.

The electrodes can be made of tubes of non-conducting materials, e.g., glass, filled e.g., with aqueous or metal electrolytes. Such electrodes do not disturb the alternating field and can, thus, be used to advantage. A field of very high direct voltage must, however, be used. In equipment of some size this may lead up to about 220 kV, which presents some problems, such as expensive protecting measures which are to be taken and so forth. The fire hazard can not be ruled out completely either, since humidity may lead to discharges. Dark discharges on the other hand may cause ozone to evolve steadily. Not only the alkaloids may be attacked by it, but in the presence of ammonia, undesirable oxidation products may appear. For all these reasons one may decide to operate larger units in a nitrogen or other inert atmosphere.

As compared with the electric field, it is relatively easy to provide the required field strength by means of a magnetic field, which requires no high-tension — or any other current for that matter. When nothing but ergotamine is to be produced, even permanent magnets, requiring no maintenance at all, can be used. Since the poles of the magnet can be located outside of the vessel or recipient in which the reaction takes place, no technical difficulties occur since all high voltage conductances and the like are being avoided. Of course, the magnetic field does not induce as stable dipoles as the electrostatic field does, and this slightly increases the time needed for the reaction. Thus, in both cases the risk of oxidation is about the same. No ferrometallic substance may be used near the magnets, otherwise the homogenity of the field would be affected.

The invention takes advantage of the fact that the asymmetry centers of certain types of molecules, e.g., those of the lysergic acid type ergot alkaloids, can be excited by a static or low-frequency electric or magnetic field and a high-frequency alternating field, thereby initiating the steric conversion into an isomer; in the case of the lysergic acid type, into isolysergic acid or its natural derivates, respectively. The reaction, once started, continues spontaneously. In this process ergotamine is converted resersibly into a particularly insoluble substance, ergotaminine, while the solubilities of the other alkaloids present are not too significantly changed.

Thus two fields are required to bring about the separation. Since the dipole moments of this type of molecules, e.g., of ergotamine and of the other ergot alkaloids is very low, dipoles must be induced first by a static or low-frequency electric field or by a magnetic field, to ensure the effect of the high-frequency-field, which — in the case of ergotamine separation — consists of exciting the asymmetry-centers of the molecules. The field-intensity of the static or low-frequency fields and the frequency of the high-frequency field are interdependent. Greater field strength demands higher frequency and vice versa.

The optimum frequency for the high-frequency alternating field at any given electric field intensity or for any given magnetic-field intensity should preferably be determined by experiment, since the constants of the numerous pieces of equipment and of the different materials can hardly be determined by calculation alone.

In practice, the use of the frequency of 27,120 megacycles, which is free for industrial use, proved to be very advantageous. The strength of the electric or magnetic fields had been adjusted in accordance.

An advantage of the process according to the invention is that the yield of ergotamine is much superior to that obtained with the traditional methods. Furthermore, the coloring substances, oils and other nonalkaloids which are extracted from the ground-up ergot and which in the known processes find their way into the chlorinated hydrocarbon solutions, disturbing the operations very considerably, are instantly and almost completely eliminated in the new process. The production of toxic residues is being reduced substantially, since due to the short exposure time the decomposition-losses diminish sharply. By its careful handling of the delicate molecules the process according to the invention is also suitable to serve as a first stage in the separation of the problem-alkaloids, such as, e.g., the ergotoxines and similars. By the same token the process may be used to handle other molecules beside alkaloids as well if their electrical properties are similar to those of the above-described type. It appeared to be of advantage to dissolve the raw substance containing the ergot-alkaloids in a chlorinated hydrocarbon, thus, for example, in chloroform, perchloroethylene or trichloroethylene: One may, for instance, proceed as follows: The dried and subsequently pulverized crude ergot plant is mixed with chloroform and after periodical shaking-up its solid components, e.g., cellulose-particles, are removed by filtration.

It proved particularly advantageous to expose the alkaloids to the fields described above while they are suspended in a mixture of a polar and of a non-polar solvent; e.g., in a mixture of water and a chlorinated hydrocarbon, such as chloroform, perchloroethylene, trichloroethylene, etc., in presence of a alkali, such as sodium carbonate, ammonia, sodium hydrocarbonate, potassium carbonate, potassium hydrocarbonate, etc., preferably at a pH of 8 to 9.

This way an ideal energy-transfer occurs due to the hydroxy-groups.

Such a solution, containing the alkaloids, can to great advantage and according to the invention be exposed to the electric or magnetic and electromagnetic fields described above, while it is being kept in vigorous motion by a mechanical mixing or stirring device. By this motion the moleculae of the alkaloids are prevented from remaining absorbed for too long upon the surface of the electrodes. They are swept away and their place can be taken by others which have not yet been fully exposed to the electromagnetic field's action.

With regard to the unstability of the moleculae to be separated the very shortness of the treatment proposed in this invention represents considerable progress when compared with the traditional methods in which treatment time is being measured in days.

So as to ensure the desired isomerisation, preferably an electromagnetic field with a frequency of between 2 and 60 megacycles, an electrostatic field with a strength from 3 to 12 kV/cm, or respectively a magnetic field with a strength of 10 to 50 kGauss can be applied. The use of electromagnetic fields of higher frequency is not recommended, since they are not only very considerably more expensive then the proposed ones, but their pentration depth decreases with increasing frequency values. The isomerisation effect of electromagnetic fields with frequencies below 2 megacycles proved to be unsatisfactory with the moleculae that have been treated up to this date. It may be that some moleculae react to those lower frequencies. If they do, their application still remains part of the present invention.

The treatment in accordance with the invention is preferably performed inside a reaction-vessel, made of electrically non-conducting material, e.g., glass. The high frequency electromagnetic field will suitably be generated by a coil or by electrodes supplied with high-frequency-energy and which are located outside the reaction vessel.

The electrodes used for generating the electric field have preferably an elongated electrolyte which may consist, e.g., of an aqueous solution, of a metal wire or of a quicksilver column, all of them surrounded by an insulator, e.g., glass. These electrodes are immersed into the liquid.

Besides the electrodes generating the electric field and the liquid under treatment the reactor vessel also contains a mixing device which is actioned by a power-source located outside the vessel.

According to the invention the precipitated ergotaminine is separated from the liquid by mechanical means. To this end centrifuges, preferably such equipped with a high-speed, so-called zone-rotors can be used.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
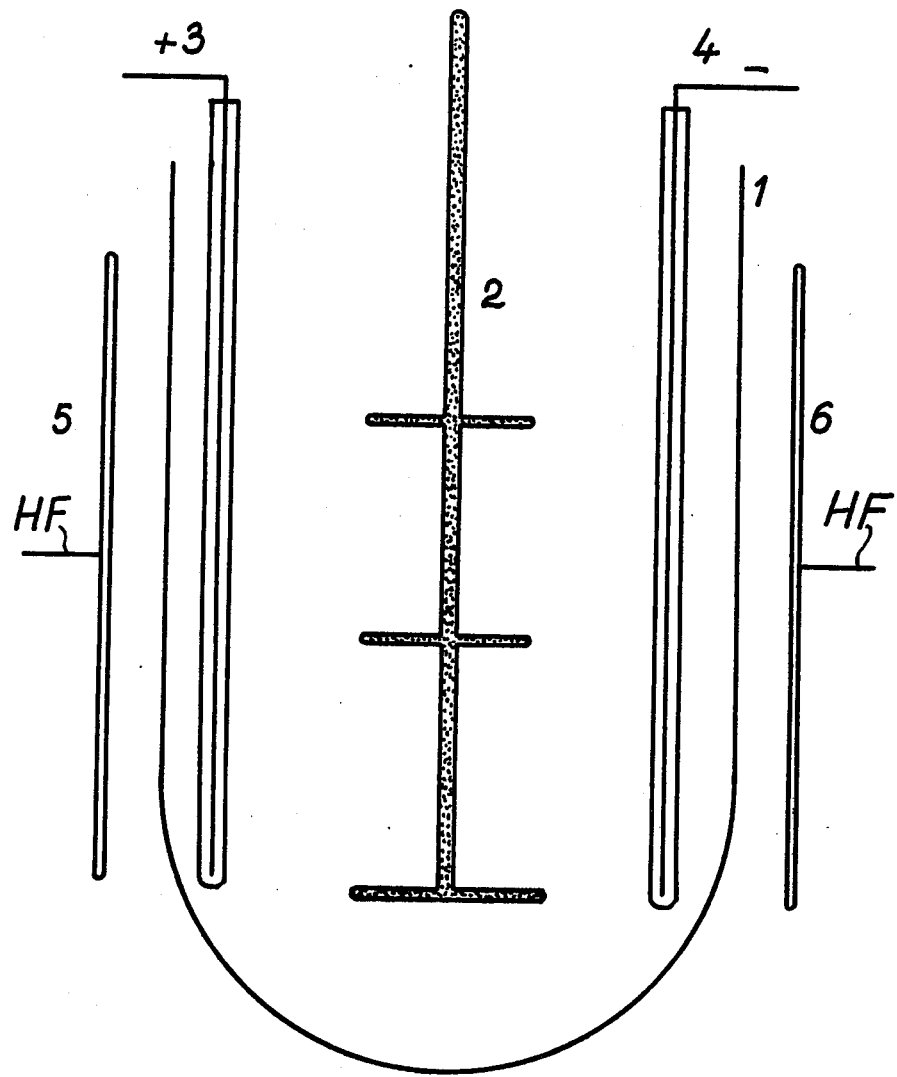
FIG. 1 illustrates an equipment wherein an electrostatic field and a high-frequency electromagnetic field are used.

The equipment shown in FIG. 1 consists of a reaction-vessel 1 made of an insulating material with low dielectric constant and low dielecteic loss factor. This reaction-vessel 1 is provided with a stirrer or mixer 2. The electrodes 3 and 4 between which either a direct tension or a low-frequency alternating tension or a half-wave tension is established, are immersed into the reaction-vessel 1. The electrodes 3 and 4 are made of a conducting material and, at least as far as they are immersed into the reaction-vessel 1, covered with an insulator, preferably with glass. The plate (sheet) electrodes 5 and 6 are used to produce the high-frequency electromagnetic field. They remain outside the reaction-vessel 7.

Figure 2:
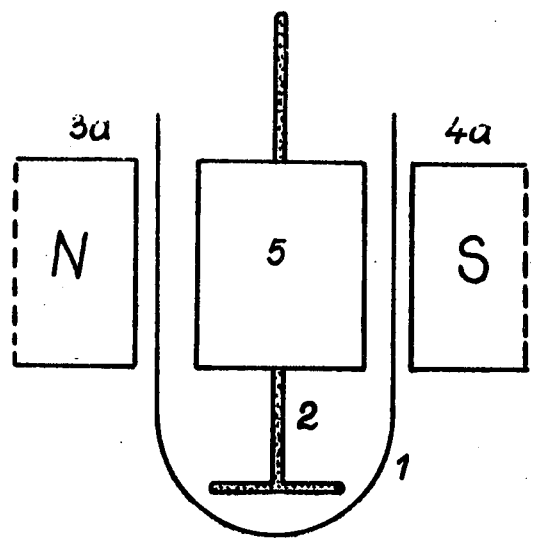
FIG. 2 illustrates an equipment wherein a magnetic field and a high-frequency electromagnetic field are used.
Figure 3:
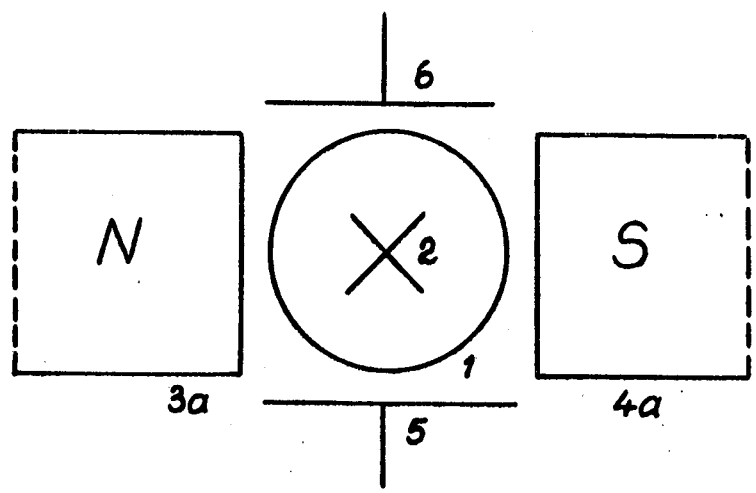
FIG. 3 shows the top-view of the equipment as depicted in FIG. 2.

In the equipment shown in FIGS. 2 and 3 are contained a reaction-vessel 1 provided with a mixer 2. The electromagnets 3 and 4 are located on opposite sides of the reaction-vessel, oriented with their northern or southern poles, respectively. The electrodes 5 and 6, which produce the high-frequency electro-magnetic field, are in this case too placed outside the vessel, and they are rotated by 90° with respect to the magnets.

While specific embodiments of the invention have been shown and described in detail to illustrate the application of the inventive principles, it will be understood that the invention may be embodied otherwise without departing from such principles.

What is claimed is:

1. A process for the separation of ergotamine, in which a liquid containing a mixture of ergot-alkaloids is treated with a static or low-frequency electric and/or magnetic field and simultaneously with a high-frequency electromagnetic field; the thereby formed ergotaminine is separated as a poorly soluble precipitate, and is re-converted into an ergotamine by a known process.

2. A process as claimed in claim 1, in which the liquid containing the ergot-alkaloids is mixed with one or more chlorinated hydrocarbons.

3. A process as claimed in claim 2, in which an alkaline solution is added to the liquid.

4. A process as claimed in claim 3, in which an alkaline solution of pH 8 to pH 9 is used.

5. A process as claimed in claim 1, in which the liquid is kept in motion, preferably by stirring while under treatment with the electric and/or magnetic field and with the high-frequency electromagnetic field.

6. A process as claimed in claim 1, in which an electrostatic or low-frequency field of 2 to 12 Kv/cm is being used.

7. A process as claimed in claim 1, in which a magnetic field with a strength of 10 to 50 kGauss is being used.

8. A process as claimed in claim 1, in which a high-frequency electromagnetic field with a frequency of 2 to 60 megacycles is utilized.

9. A process as claimed in claim 1, in which the treatment with an electric and/or magnetic field and a high-frequency electromagnetic field is continued for 2 to 30 minutes, preferably for 2 to 12 minutes.

10. A process as claimed in claim 1, in which the electric field is generated by electrodes or by a coil located outside the liquid to be treated, and supplied with energy of high frequency.

11. A process as claimed in claim 1, in which the electrodes generating the electric field have an elongated electrolyte, preferably a column formed by an aqueous solution or a metal, surrounded by an insulator, preferably of glass, and in which the electrodes are at least partially immersed into the liquid under treatment.

12. A process as claimed in claim 1, in which the precipitate is separated from the rest of the liquid by mechanical means.

13. A process as claimed in claim 1, in which the precipitate is separated from the liquid by centrifugation.

14. A process as claimed in claim 1, in which the ergotamine-ergotaminine pair of molecules is substituted by another pair, which, due to their structure and/or electrical properties respond to the treatment according to the invention.

* * * * *